Patented Nov. 2, 1948

2,452,534

UNITED STATES PATENT OFFICE 2,452,534

PRODUCTION OF BIOCHEMICALLY PROCESSED LIQUID BASE MATERIAL FOR FOOD PRODUCTS

George A. Jeffreys, Salem, Va., assignor, by direct and mesne assignments, to Nelson Littell, New Canaan, Conn.

No Drawing. Application February 10, 1945, Serial No. 577,340

13 Claims. (Cl. 99—9)

This invention relates to biochemical processes and particularly to improvements in the production of biochemically processed liquid base material for enhancing the nutritional value, digestibility and other qualities of food products, such as animal feeds.

Such a liquid base material, its preparation and food products containing it are disclosed in my United States Patent No. 2,095,638. Certain improvements in the preparation of the base are disclosed in my co-pending application Serial No. 353,471, filed August 21, 1940, and issued March 6, 1945, under No. 2,370,665. According to the embodiment described in said patent, a mixture containing water, cereal starch (as ground grain) and molasses or similar sucrose-bearing material is first cooked to gelatinize the starch, then is converted with diastase and cultured with yeast to change starch to sugars and to develop yeast and vitamins, then is enriched with molasses or the like, and finally is cultured with lactic acid bacillae until a syrupy liquid of high nutritional value has formed.

According to the embodiment described in said copending application, the steps of cooking and liquefying the starting mixture are carried out simultaneously at temperatures below 100° C. in the presence of diastatic enzymes and, preferably, of starch-hydrolysis accelerating agents, so as to obtain in one continuous operation a nutrient liquid wherein the starch has been largely converted to fermentable sugars. Molasses or the like is added to this liquid, and it is then cultured with yeast and with lactic acid organisms until yeast, vitamins and lactic acid have been properly developed in a liquid base having the desired physical consistency.

The practices above referred to, though valuable, have had several limitations for which remedies have been desirable but heretofore unknown: Molasses has been difficult to obtain for use in the process, and even when used the content of sugars in the final cultured base has been only about 3% of its weight. The yeast count of the base has averaged around 100 million cells per gram. There has been a very substantial loss of weight or nutritional values from the materials used, as $CO_2$ during the culturing steps and by evaporation from the finished composite feeds. Prolonged culturing periods of up to 72 hours have been employed; and because of this and the requirements for molasses and inoculating cultures and the losses of weight encountered, the process has been unnecessarily expensive, as viewed after the attainment of the present improvements.

It therefore is an object of my present invention to improve the process of producing such liquid base material so as to overcome one or more of the limitations above noted. More particularly, by this invention I propose to increase the sugar content of the cultured base; to eliminate the need for molasses or similar sucrose-bearing material in its production; to increase the yeast count of the base; to produce the base more economically than heretofore; to reduce evaporation losses from feeds containing it; and to improve the preservative action of such feeds.

Another object of my invention is to provide an improved biochemically processed liquid base material for food products having a unique and valuable combination of three important characteristics: (1) a high yeast count of at least 150 million cells per gram, (2) a high sugar content exceeding 8% of the total weight, and (3) a high content of lactic acid and lactic acid organisms.

This invention involves a recognition and utilization of the principles that reduction of the sugar content of the base during its production and losses of weight and nutrients from feeds containing it have come about heretofore from the formation of alcohol in the nutrient liquid during the culturing operations, and afterwards while the feeds awaited use; that the alcohol results not from the yeast growth as such but from the secretion of the enzyme zymase by mature yeast and its action upon fermentable sugars in the liquid; and that this action can be so avoided as to increase greatly the sugar content of the cultured base, to eliminate the need for molasses additions, and to improve the preservative action and nutritional value of foods containing the base, through acceleration of the yeast growth by carrying it out in the presence of fungus enzyme material, and through adjustment of the pH reaction of the nutrient liquid, after the yeast has grown actively for an adequate period, so that the secretion and activity of zymase are inhibited without killing the yeast, and so that, at the same time, a condition is established more favorable to the subsequent development of lactic acid organisms in the base itself or in feeds containing it.

The yeast growth may be re-accelerated at any time after the change of pH by readjusting the pH and other culturing conditions approximately to their original status, and I have found it possible and highly beneficial to use the converted but as yet uncultured liquid for effecting this readjustment. These principles are utilized in preferred embodiments of my invention by combining the uncultured liquid as produced from the cooking and conversion steps with a portion of the "old" cultured base produced by previous operation of the entire process, in which old base the pH had been adjusted for avoidance of zymase activity. In other words, a given quantity of old or cultured base may be doubled or trebled with fresh or uncultured nutrient liquid. In this way, which may be aptly called a "doubling back process," a new composite body of nutrient liquid is produced which contains its own yeast and lactic acid organisms carried in with the portion of old culture, and in which the yeast and the lactic acid organisms will develop vigorously without any new inoculation with seed yeast or lactic acid cultures. The only other material required is a fresh addition of fungus enzyme material.

I have found that a greatly increased concentration not only of sugars but also of yeast cells can be produced in this way in the finished base, and yet a valuable reduction of the processing time along with other new results can be also achieved. Further, the doubling back can be continued time after time without objectionable development of wild or other harmful strains of organisms, so that inoculating cultures are required infrequently, if at all, after the process has been once operated. The great concentration of desired organisms supplied to the nutrient liquid in the reprocessed portion of cultured base, together with the continued acclimation of these desired organisms to the conditions of the culturing operations, seem to account for this latter advantage.

Thus, my invention enables the culturing of an improved liquid base material in a semi-continuous manner at very important savings of materials and expense. By reducing the culturing period it also permits a great increase in the producing capacity of a given equipment installation.

The features of process operation and control constituting my invention are set forth particularly in the appended claims, and a preferred manner of practicing it will become apparent from the following illustrative description.

To start the process a mixture is formed of cereal starch substance with water and diastatic enzymes (diastase). The starch substance preferably is wheat flour or ground wheat, but corn meal, grits or other ground cereal grain or flour may be used too. In addition, it is desirable to use a small percentage of soy bean meal or the like, or powdered milk, or small percentages of both, to provide additional nutrients and, particularly, to supply amino-acids which tend to accelerate hydrolysis of the starch substance. A small amount of common salt also may be added to stabilize the mixture and influence the taste of the finished liquid base.

The diastatic enzmyes employed at the start preferably include malt, which exhibits high diastatic activity, together with a smaller proportion of fungus enzyme material. But either malt or fungus enzyme material or commercial diastase in other forms may be employed if desired.

By fungus enzyme material I mean a material containing substantial concentrations of the amylase and proteinase which growing molds parasitic to cereals develop when the mycellium of such molds is suitably cultured to maturity on particles of cereal grains. The material may be either the mold culture itself, including the substrate of cereal particles, the molds thereon and the developed enzymes, or an extract or concentrate which contains the enzymes extractable by water from the mold culture. One such material is known commercially as "moldy bran." The material preferably used, however, is one having substantially the same characteristics as those disclosed in and prepared by the process of my co-pending application Serial No. 493,804, filed July 8, 1943. According to that process, among other things, substantially sterile moistened particles of cereal grains are heavily inoculated with spores of the selected molds and are then incubated in quiescent air-pervious layers for about 24 to 30 hours in a humid atmosphere at temperatures regulated to keep the culture between about 30° and 37° C., after which the culture may be dried and ground to a powder, or may be extracted with water to obtain a fungus enzyme extract. The molds selected for the best results are suitably acclimated strains of the genus Aspergillus, such as *Aspergillus oryzae, aspergillus flavis* and sub-species thereof; but other cereal molds may be used which produce diastatic and proteolytic enzymes during their growth, including those of the genera Mucor and Rhizopus, for example, *Mucor roxii, Rhizopus delamar,* and *Rhizopus tritici.*

The starting mixture is usually made to contain about one part of dry matter to about 1 to 2 parts of water, according to the concentration desired. A suitable mixture, for example, contains by weight about 87 parts of wheat flour, 3 parts of soy bean meal, 2 parts of powdered milk, 6 parts of malt, 1 part of fungus enzyme material in the form of dried culture, and 1 part of salt, which is mixed with about 170 parts of water. Another suitable starting mixture is that given as an example in my aforesaid copending application, Serial No. 353,471.

The starting mixture having been formed, it is heated progressively to a maximum temperature well above 60° C., so that the starch substance in it will be disrupted and then gelatinized and hydrolyzed to a liquid state. In the case of wheat flour mixtures this cooking is continued about 10 to 20 minutes or longer at temperatures above 60° C., which is approximately the critical cell disruption temperature of wheat starch. The maximum temperature preferably is held below 92° C., however, say at 80° C., so as to avoid inactivation of enzymes remaining in the material after liquefaction.

The result of the foregoing is a nutrient liquid in which starches have been largely converted to sugars such as dextrin, maltose and dextrose. This liquid is cooled to a temperature suitable for yeast growth, say to below 33° C. but not lower than 22° C., and it is then ready for use as the culture medium for the culturing of yeast and lactic acid organisms.

The above-mentioned steps of forming the mixture of dry ingredients with water, cooking and converting the mixture at relatively low temperatures below 100° C. and cooling the resulting liquid may be, and preferably are, carried out substantially as disclosed in said co-pending application Serial No. 353,471.

To prepare the nutrient liquid first obtained for the culturing steps, fungus enzyme material is added thereto, its pH is adjusted to about pH 4.5 to pH 6.0, say to pH 5.2, by the addition to suitable mineral or food acid; and it is thereafter inoculated with active cultures of seed yeast and lactic acid bacillae.

The fungus enzyme material preferably is added in the form of an aqueous slurry containing ground fungus enzyme culture and a smaller proportion of malt. The amount of fungus enzyme required is usually equivalent to about 1 to 3% of such a culture, based on the weight of dry matter in the nutrient liquid. For example, I now prefer to use for each 1000 gallons of uncultured nutrient liquid produced as aforesaid a slurry containing about 50 pounds of such culture and about 25 pounds of malt in 25 to 50 gallons of water. It is desirable to heat the slurry to between 55° and 60° C. before adding it, in order to kill any wild yeast or mold spores present.

To establish the desired pH in the original nutrient liquid I may add, for example, about 1 pint of concentrated sulfuric acid for each 1000 gallons of the liquid, which usually gives a pH of about 5.2. Hydrochloric acid, phosphoric acid, or food acids such as citric, lactic, or tartaric acid, also may be used, in quantities varying with their relative effectiveness to establish the pH desired for most active yeast growth.

The original yeast inoculation may be performed with an active culture of seed yeast or with compressed yeast. About 1% of the former or ½% of the latter, based on the weight of the nutrient liquid, usually is sufficient. At the same time, or a few hours later if desired, the liquid is inoculated with the active culture of lactic acid bacillae. This may be a 48-hour milk culture of B. Acidophilus, B. Bulgaricus, or the like. One quart of such a culture for each 1000 gallons of liquid is usually sufficient.

The amounts of seed yeast and lactic acid culture used, of course, can be varied according to the concentration of the inoculating medium and the type of fermentation desired.

The inoculated liquid then is cultured until a full growth of yeast has been attained, and preferably somewhat longer to a full 24 hours or so, as hereinafter described. Under the conditions employed the yeast growth takes place with extraordinary rapidity and abundance, and is usually complete in about 16 hours. The culturing temperature during this time preferably is held at about 30° to 33° C., and during the first 10 to 14 hours the culture is aerated vigorously to favor maximum yeast growth.

After the desired development of yeast has been attained, the secretion and activity of zymase are throttled by adding to the culture a suitable mineral or food acid as aforesaid, in an amount sufficient to give the liquid a pH of about 2.8 to 3.8. The culturing temperature is lowered to between 22° C. and 27° C. before this addition. For example, about 16 hours after the start of culturing the temperature may be reduced, and at the 18th hour about one gallon of concentrated sulfuric acid may be added per 1000 gallons of original nutrient liquid, thus imparting to the culture a pH of about 3.

The acidified liquid base material may now be used immediately if desired, but it preferably is held to at least a full 24 hours of culturing in order to enhance its content of lactic acid and lactic acid organisms, which continue to develop actively under the reduced temperature and pH conditions established after full yeast growth. The preservative action of the finished base in composite food products thus may be substantially improved.

The liquid base material first obtained as above described is characterized by a syrupy consistency, a yeast count of at least 150 million cells per gram, a sugar content of about 25 to 55% of its total dry matter, or 8 to 15% of the weight of the liquid, a content of lactic acid equal to at least 2% of the weight of the liquid and a high content of lactic acid organisms.

To continue the production of liquid base material according to the doubling back process, with resulting economies and further enhancement of the desired qualities just described, one or more portions of the batch or quantity of base originally produced as aforesaid, say a half or a third of it, is doubled or trebled in volume by combining such portion with as much or twice as much nutrient liquid that has been converted as aforesaid, but has not as yet been cultured.

The result of this doubling back is a composite culture liquid containing its own active yeast and lactic acid organisms, having a pH of about 4.5 to 6.0 suitable for the resumption of rapid yeast growth and the development of lactic acid organisms, and in which the temperature tends to rise again to the general culturing temperature of about 30° to 33° C. When this composite liquid is formed, fungus enzyme material is added thereto, preferably in a slurry as above described, in an amount bearing the same ratio to the amount of uncultured nutrient liquid used as is specified above for the original operation. No addition of seed yeast or lactic acid organisms is required.

The composite liquid is cultured in substantially the same way as the original liquid. After about 16 to 24 hours, say 18 hours, its temperature is lowered to 22° to 27° C. and acid as aforesaid is added to it in a quantity sufficient to reduce its pH to about 2.8 to 3.8. For example, about ½ gallon of concentrated sulfuric acid is added per 1000 gallons of composite liquid when equal amounts of the previously cultured and the uncultured liquid were combined in the doubling back step; about ⅔ gallon of such acid per 1000 gallons of composite liquid may be added when the cultured liquid was combined with uncultured liquid in a ratio of one to two.

Continued culturing of the acidified composite liquid for another 6 hours or so, say to a total of at least 24 hours from the time of doubling back, will yield a finished liquid base material wherein the yeast count is at least 150 million cells per gram, the sugar content is 25 to 55% of the total dry matter or 8 to 15% of the weight of liquid, and the content of lactic acid is at least 2% of the weight of the liquid. The content of lactic acid bacteria may vary from about 100 million up to several billion per cubic centimeter of liquid, depending upon the species of organism used and other culturing conditions.

The doubling back process may be continued time after time, to as many as six to twelve repetitions or more, without encountering objectionable contamination of the cultures in process. By the use of enough culturing tanks of proper capacity, based upon the rate of production of the converted nutrient liquid, a time schedule of operation may be readily arranged whereby finished base from one or more tanks is always available for use in making feeds to contain the same, and whereby one or more tanks containing an unused portion of previously finished base will always be available for the reception of nutrient liquid being produced from the continuous mixing, cooking and converting operations. Inasmuch as the cultured base can be kept for days without deterioration, much flexibility is available in scheduling the operation of the entire process.

The objects of my invention as set forth hereinabove are fully achieved by an illustrative embodiment of the type described and by other practices which may depart from its details but nevertheless utilize the novel principles and practices disclosed herein and set forth in the claims. The invention therefore should be accorded a scope commensurate with its contributions to the art, without restriction except as may be required by the terms of the claims and the prior art.

I claim:

1. In a biochemical process for producing a liquid nutritional material for food products, wherein cereal starch substance in water is cooked and converted to obtain a nutrient liquid and yeast and lactic acid organisms, respectively, are cultured in such liquid until such material is obtained, the improvement which comprises incorporating mold enzymes with the nutrient liquid obtained after the cooking and conversion steps and thereafter culturing yeast and lactic acid organisms therein in the presence of such mold enzymes.

2. In a biochemical process for producing a liquid nutritional material for food products, wherein cereal starch substance in water is cooked and converted to obtain a nutrient liquid and yeast and lactic acid organisms, respectively, are cultured in such liquid until such material is obtained, the improvement which comprises incorporating mold enzymes with the nutrient liquid obtained after the cooking and conversion steps, adjusting same to pH 4.5 to 6.0, incorporating seed yeast and lactic acid organisms therewith, and culturing the same for about 14 to 18 hours at temperatures conducive to rapid yeast propagation while aerating vigorously during the first 10 to 14 hours.

3. In a biochemical process for producing a liquid nutritional material for food products, wherein cereal starch substance in water is cooked and converted to obtain a nutrient liquid and yeast and lactic acid organisms, respectively, are cultured in such liquid until such material is obtained, the improvement which comprises incorporating mold enzymes, seed yeast and lactic acid organisms with the nutrient liquid obtained after the cooking and conversion steps, culturing the same, with aeration, at temperatures conducive to rapid yeast propagation until full growth of the yeast has occurred, and then acidifying the same to curtail zymase activity yet continue development of lactic acid organisms.

4. A process as described in claim 3 wherein the culturing temperature is maintained at about 30 to 33° C. for about 14 to 18 hours and is reduced to about 22° to 27° C. before the acidification step.

5. A process as described in claim 3 wherein the yeast culturing is continued about 14 to 18 hours and culturing is continued after the acidification at about 22° to 27° C. to a total of at least 20 to 24 hours.

6. A process as described in claim 3 wherein the nutrient liquid is adjusted to pH 4.5 to 6.0 before the seed yeast is incorporated therewith.

7. A process as described in claim 3 wherein the acidification of the culture is to a pH of about 2.8 to 3.8.

8. A process as described in claim 3 wherein acid from the group consisting of innocuous mineral and food acids is added to the culture at the end of the period of rapid yeast propagation in an amount sufficient to establish a pH of 2.8 to 3.8 therein.

9. In a biochemical process for producing a liquid nutritional material for food products, wherein cereal starch substance in water is cooked and converted to obtain a nutrient liquid and yeast and lactic acid organisms, respectively, are cultured in such liquid until such material is obtained, the improvement which comprises incorporating mold enzymes, seed yeast and lactic acid organisms with nutrient liquid obtained after the cooking and conversion steps, thereafter culturing the same, with aeration, at temperatures conducive to rapid yeast propagation until full growth of the yeast has occurred, then acidifying the same to curtail zymase activity yet allow continued development of lactic acid organisms, thereafter culturing the same further to obtain such nutritional material, and thereafter incorporating further nutrient liquid obtained with a portion of said material and with fresh mold enzymes to form a composite culture liquid in which the yeast will resume rapid propagation and subjecting said composite culture liquid to yeast culturing, acidifying and further culturing steps as aforesaid in continuation of the producing process.

10. A process as described in claim 9 wherein the yeast culturing is carried out for about 14 to 18 hours at about 30° to 33° C. with vigorous aeration during the first 10 to 14 hours.

11. A process as described in claim 9 wherein the nutrient liquid first processed is adjusted to a pH of 4.5 to 6.0 before incorporating the seed yeast therewith.

12. A process as described in claim 9 wherein the acidification is carried out after about 14 to 18 hours of culturing, by adding acid from the group consisting of innocuous mineral and food acids in an amount sufficient to impart a pH of 2.8 to 3.8.

13. A process as described in claim 9 wherein the yeast culturing is carried out at about 30 to 33° C. and the further culturing is carried out at about 22° to 27° C.

GEORGE A. JEFFREYS.

REFERENCES CITED

The following references are of record in the file of this patent:

UNITED STATES PATENTS

| Number | Name | Date |
|---|---|---|
| 525,819 | Takamine | Sept. 11, 1894 |
| 525,822 | Takamine | Sept. 11, 1894 |
| 1,737,279 | Wallerstein | Nov. 26, 1929 |
| 2,095,638 | Jeffreys | Oct. 12, 1945 |
| 2,370,665 | Jeffreys | Mar. 6, 1945 |

FOREIGN PATENTS

| Number | Country | Date |
|---|---|---|
| 17,374 | Great Britain | 1891 |